US012680373B2

(12) United States Patent
Depew et al.

(10) Patent No.: US 12,680,373 B2
(45) Date of Patent: Jul. 14, 2026

(54) MULTI-PIECE SILL ASSEMBLY FOR FENESTRATIONS

(71) Applicant: Andersen Corporation, Bayport, MN (US)

(72) Inventors: Justin Michael Depew, Stillwater, MN (US); Craig Michael Johnson, North Oaks, MN (US)

(73) Assignee: Andersen Corporation, Bayport, MN (US)

( * ) Notice: Subject to any disclaimer, the term of this patent is extended or adjusted under 35 U.S.C. 154(b) by 202 days.

(21) Appl. No.: 18/399,114

(22) Filed: Dec. 28, 2023

(65) Prior Publication Data

US 2024/0254826 A1 Aug. 1, 2024

Related U.S. Application Data

(60) Provisional application No. 63/441,613, filed on Jan. 27, 2023.

(51) Int. Cl.
*E06B 1/70* (2006.01)

(52) U.S. Cl.
CPC .................................... *E06B 1/70* (2013.01)

(58) Field of Classification Search
CPC .......... E06B 1/70; E06B 1/702; E06B 1/6053; E06B 2001/707
See application file for complete search history.

(56) References Cited

U.S. PATENT DOCUMENTS

| | | | | |
|---|---|---|---|---|
| 10,087,678 | B2 * | 10/2018 | Pettibone | E06B 1/702 |
| 10,472,882 | B1 | 11/2019 | Pettibone | |
| 2015/0096235 | A1 * | 4/2015 | Rochman | E06B 7/26 49/470 |
| 2016/0145931 | A1 * | 5/2016 | Meeks | E06B 1/70 49/468 |

FOREIGN PATENT DOCUMENTS

| | | | | |
|---|---|---|---|---|
| DE | 29612478 U1 * | 1/1998 | | E06B 1/70 |
| EP | 1932996 A2 * | 6/2008 | | E06B 1/70 |
| FR | 2967712 A1 * | 5/2012 | | E06B 1/70 |
| GB | 2368085 A * | 4/2002 | | E06B 1/702 |

OTHER PUBLICATIONS

English machine translation of FR2967712 (Year: 2025).*

* cited by examiner

*Primary Examiner* — Christine T Cajilig
(74) *Attorney, Agent, or Firm* — Pauly, DeVries Smith & Deffner LLC

(57) ABSTRACT

Embodiments herein relate to multi-part sill assemblies for fenestrations. In an embodiment, a multi-part sill assembly for a fenestration unit is included having an exterior sill subunit and an interior threshold subunit. The exterior sill subunit can be formed of a metal and the interior threshold subunit can be formed of a composite material. The interior threshold subunit can be joined to the exterior sill subunit by at least three different points of contact. The three different points of contact can include a pivoting joint; a locking joint; and an adhesive joint. Other embodiments are also included herein.

20 Claims, 9 Drawing Sheets

MULTI-PIECE SILL ASSEMBLY FOR FENESTRATIONS

This application claims the benefit of U.S. Provisional Application No. 63/441,613, filed Jan. 27, 2023, the content of which is herein incorporated by reference in its entirety.

FIELD

Embodiments herein relate to sill assemblies for fenestrations. More particularly, embodiments herein relate to multi-part sill assemblies for fenestrations.

BACKGROUND

Fenestration units can include windows, patio doors, entry doors, and the like. Such fenestration units typically include frame members, including a sill or sill assembly. A sill is a horizontal piece of material that sits at the bottom of a door or window opening providing structural support as part of a frame system. The sill can also serve as a barrier to keep drafts and water from entering the building through the door or window opening.

SUMMARY

Embodiments herein relate to multi-part sill assemblies for fenestrations. In a first aspect, a multi-part sill assembly for a fenestration unit can be included having an exterior sill subunit, wherein the exterior sill subunit can be formed of a metal, and an interior threshold subunit, wherein the interior threshold subunit can be formed of a composite material. The interior threshold subunit can be joined to the exterior sill subunit by at least three different points of contact. The three different points of contact can include a pivoting joint, a locking joint, and an adhesive joint.

In a second aspect, in addition to one or more of the preceding or following aspects, or in the alternative to some aspects, the exterior sill subunit can include an adhesive distribution shelf, wherein the adhesive joint can be formed with the adhesive disposed between the adhesive distribution shelf and a surface of the interior threshold subunit.

In a third aspect, in addition to one or more of the preceding or following aspects, or in the alternative to some aspects, the adhesive distribution shelf can be curved.

In a fourth aspect, in addition to one or more of the preceding or following aspects, or in the alternative to some aspects, the adhesive distribution shelf can be curved downward and towards an interior side of the multi-part sill assembly.

In a fifth aspect, in addition to one or more of the preceding or following aspects, or in the alternative to some aspects, the adhesive can be a high modulus adhesive.

In a sixth aspect, in addition to one or more of the preceding or following aspects, or in the alternative to some aspects, the exterior sill subunit further can include an adhesive retention channel, wherein the adhesive retention channel can be adjacent the adhesive distribution shelf.

In a seventh aspect, in addition to one or more of the preceding or following aspects, or in the alternative to some aspects, the adhesive joint forms a water-tight seal.

In an eighth aspect, in addition to one or more of the preceding or following aspects, or in the alternative to some aspects, the locking joint can include a snap-fit mechanism.

In a ninth aspect, in addition to one or more of the preceding or following aspects, or in the alternative to some aspects, the snap-fit mechanism includes complementary portions disposed on the interior threshold subunit and the exterior sill subunit.

In a tenth aspect, in addition to one or more of the preceding or following aspects, or in the alternative to some aspects, the pivoting joint can include a receiver and a projection.

In an eleventh aspect, in addition to one or more of the preceding or following aspects, or in the alternative to some aspects, wherein at least one of the projection and the receiver can be disposed on the interior threshold subunit and the other can be disposed on the exterior sill subunit.

In a twelfth aspect, in addition to one or more of the preceding or following aspects, or in the alternative to some aspects, the pivoting joint can be disposed below the adhesive joint.

In a thirteenth aspect, in addition to one or more of the preceding or following aspects, or in the alternative to some aspects, the pivoting joint can be disposed at an exterior position relative to the adhesive joint.

In a fourteenth aspect, in addition to one or more of the preceding or following aspects, or in the alternative to some aspects, the pivoting joint can be adjacent a top of the multi-part sill assembly.

In a fifteenth aspect, in addition to one or more of the preceding or following aspects, or in the alternative to some aspects, the locking joint can be disposed below the adhesive joint.

In a sixteenth aspect, in addition to one or more of the preceding or following aspects, or in the alternative to some aspects, the locking joint can be disposed at an exterior position relative to the adhesive joint.

In a seventeenth aspect, in addition to one or more of the preceding or following aspects, or in the alternative to some aspects, the locking joint can be adjacent a top of the multi-part sill assembly.

In an eighteenth aspect, in addition to one or more of the preceding or following aspects, or in the alternative to some aspects, the composite material can include a polymer resin and wood particles.

In a nineteenth aspect, in addition to one or more of the preceding or following aspects, or in the alternative to some aspects, the polymer resin can include polyvinylchloride.

In a twentieth aspect, in addition to one or more of the preceding or following aspects, or in the alternative to some aspects, the composite material can include a polymer resin, wood particles, and glass fibers.

In a twenty-first aspect, in addition to one or more of the preceding or following aspects, or in the alternative to some aspects, the metal can be aluminum.

In a twenty-second aspect, in addition to one or more of the preceding or following aspects, or in the alternative to some aspects, the fenestration unit can be an entry door.

In a twenty-third aspect, in addition to one or more of the preceding or following aspects, or in the alternative to some aspects, the fenestration unit can be a patio door.

In a twenty-fourth aspect, a multi-part sill assembly for a fenestration unit can be included having an exterior sill subunit and an interior threshold subunit. The exterior sill subunit can be formed of a metal. The exterior sill subunit can include a bottom projection, a first locking arm, and an adhesive distribution shelf. The interior threshold subunit can include a bottom receiving pocket, wherein the bottom receiving pocket can be configured to receive the bottom projection. The interior threshold subunit can also include a second locking arm, wherein the second locking arm can be configured to interlock with the first locking arm. The interior threshold subunit can include an inner wall surface. The interior threshold subunit can be formed of a composite material. A structural adhesive can be disposed between the adhesive distribution shelf and the inner wall surface.

In a twenty-fifth aspect, in addition to one or more of the preceding or following aspects, or in the alternative to some aspects, at least one of the first locking arm and the second locking arm defines a protruding edge and the other defines a receiving cavity for the same forming a snap-fit joint.

In a twenty-sixth aspect, in addition to one or more of the preceding or following aspects, or in the alternative to some aspects, the structural adhesive forms a water-tight seal.

In a twenty-seventh aspect, in addition to one or more of the preceding or following aspects, or in the alternative to some aspects, the structural adhesive can be a high-modulus adhesive.

In a twenty-eighth aspect, in addition to one or more of the preceding or following aspects, or in the alternative to some aspects, the structural adhesive forms a water-tight seal between the adhesive distribution shelf and the inner wall surface.

In a twenty-ninth aspect, in addition to one or more of the preceding or following aspects, or in the alternative to some aspects, the adhesive distribution shelf can be curved.

In a thirtieth aspect, in addition to one or more of the preceding or following aspects, or in the alternative to some aspects, the adhesive distribution shelf can be curved downward in an interior direction.

In a thirty-first aspect, in addition to one or more of the preceding or following aspects, or in the alternative to some aspects, the composite material can include a polymer resin and wood particles.

In a thirty-second aspect, in addition to one or more of the preceding or following aspects, or in the alternative to some aspects, the polymer resin can include polyvinylchloride.

In a thirty-third aspect, in addition to one or more of the preceding or following aspects, or in the alternative to some aspects, the composite material can include a polymer resin, wood particles, and glass fibers.

In a thirty-fourth aspect, in addition to one or more of the preceding or following aspects, or in the alternative to some aspects, the exterior sill subunit further can include an adhesive retention channel, wherein the adhesive retention channel can be adjacent to the adhesive distribution shelf.

In a thirty-fifth aspect, in addition to one or more of the preceding or following aspects, or in the alternative to some aspects, further can include an inner cavity, wherein the inner cavity can be disposed between the interior threshold subunit and the exterior sill subunit.

In a thirty-sixth aspect, in addition to one or more of the preceding or following aspects, or in the alternative to some aspects, the metal can be aluminum.

In a thirty-seventh aspect, in addition to one or more of the preceding or following aspects, or in the alternative to some aspects, the fenestration unit can be an entry door.

In a thirty-eighth aspect, in addition to one or more of the preceding or following aspects, or in the alternative to some aspects, the fenestration unit can be a patio door.

In a thirty-ninth aspect, in addition to one or more of the preceding or following aspects, or in the alternative to some aspects, the interior threshold subunit can further include a capstock layer, wherein the capstock layer can be disposed over outer surfaces of the interior threshold subunit.

In a fortieth aspect, a method of assembling a multi-part sill assembly for a fenestration unit is included. The method can include contacting a bottom portion of an interior threshold subunit with a bottom portion of an exterior sill subunit. Method can also include rotating the interior threshold subunit with respect to the exterior sill subunit sufficiently far for a locking portion on the interior threshold subunit to engage with a locking portion on the exterior sill subunit and cause an adhesive to spread along an adhesive distribution shelf on the interior threshold subunit.

In a forty-first aspect, in addition to one or more of the preceding or following aspects, or in the alternative to some aspects, the locking portion on the interior threshold subunit can be disposed on a first locking arm.

In a forty-second aspect, in addition to one or more of the preceding or following aspects, or in the alternative to some aspects, the locking portion on the exterior sill subunit can be disposed on a second locking arm.

In a forty-third aspect, in addition to one or more of the preceding or following aspects, or in the alternative to some aspects, the locking portions can be part of a snap-fit mechanism.

In a forty-fourth aspect, in addition to one or more of the preceding or following aspects, or in the alternative to some aspects, the method can further include applying the adhesive to an interior surface of the interior threshold subunit prior to the step of contacting a bottom portion of the interior threshold subunit with a bottom portion of the exterior sill subunit.

In a forty-fifth aspect, in addition to one or more of the preceding or following aspects, or in the alternative to some aspects, the adhesive distribution shelf can be curved downward and to the interior.

In a forty-sixth aspect, in addition to one or more of the preceding or following aspects, or in the alternative to some aspects, the method can further include collecting excess adhesive spreading to the exterior side in an adhesive retention channel.

In a forty-seventh aspect, a multi-part sill assembly for a fenestration unit can be included having an exterior sill subunit and an interior sill subunit. The exterior sill subunit can be formed of a metal. The exterior sill subunit can include a top receiving pocket, a first locking arm, and an adhesive distribution shelf. The interior threshold subunit can include a top projection, wherein the top projection can be configured to fit into the top receiving pocket. The interior threshold can also include a second locking arm, wherein the second locking arm can be configured to interlock with the first locking arm. The interior threshold can also include an inner wall surface. The interior threshold subunit can be formed of a composite material. A structural adhesive can be disposed between the adhesive distribution shelf and the inner wall surface.

In a forty-eighth aspect, in addition to one or more of the preceding or following aspects, or in the alternative to some aspects, at least one of the first locking arm and the second locking arm defines a protruding edge and the other defines a receiving cavity for the same forming a snap-fit joint.

In a forty-ninth aspect, in addition to one or more of the preceding or following aspects, or in the alternative to some aspects, the structural adhesive forms a water-tight seal.

In a fiftieth aspect, in addition to one or more of the preceding or following aspects, or in the alternative to some aspects, the structural adhesive can be a high-modulus adhesive.

In a fifty-first aspect, in addition to one or more of the preceding or following aspects, or in the alternative to some aspects, the structural adhesive forms a water-tight seal between the adhesive distribution shelf and the inner wall surface.

In a fifty-second aspect, in addition to one or more of the preceding or following aspects, or in the alternative to some aspects, the adhesive distribution shelf can be curved.

In a fifty-third aspect, in addition to one or more of the preceding or following aspects, or in the alternative to some aspects, the adhesive distribution shelf can be curved downward in an interior direction.

In a fifty-fourth aspect, in addition to one or more of the preceding or following aspects, or in the alternative to some aspects, the composite material can include a polymer resin and wood particles.

In a fifty-fifth aspect, in addition to one or more of the preceding or following aspects, or in the alternative to some aspects, the polymer resin can include polyvinylchloride.

In a fifty-sixth aspect, in addition to one or more of the preceding or following aspects, or in the alternative to some aspects, the composite material can include a polymer resin, wood particles, and glass fibers.

In a fifty-seventh aspect, in addition to one or more of the preceding or following aspects, or in the alternative to some aspects, the exterior sill subunit further can include an adhesive retention channel, wherein the adhesive retention channel can be adjacent the adhesive distribution shelf.

In a fifty-eighth aspect, in addition to one or more of the preceding or following aspects, or in the alternative to some aspects, further can include an inner cavity, wherein the inner cavity can be disposed between the interior threshold subunit and the exterior sill subunit.

In a fifty-ninth aspect, in addition to one or more of the preceding or following aspects, or in the alternative to some aspects, the metal can be aluminum.

In a sixtieth aspect, in addition to one or more of the preceding or following aspects, or in the alternative to some aspects, the fenestration unit can be an entry door.

In a sixty-first aspect, in addition to one or more of the preceding or following aspects, or in the alternative to some aspects, the fenestration unit can be a patio door.

In a sixty-second aspect, in addition to one or more of the preceding or following aspects, or in the alternative to some aspects, the interior threshold subunit further can include a capstock layer, wherein the capstock layer can be disposed over outer surfaces of the interior threshold subunit.

In a sixty-third aspect, a multi-part sill assembly for a fenestration unit can be included having an exterior sill subunit formed of a metal and an interior threshold subunit formed of a composite material. The interior threshold subunit can be joined to the exterior sill subunit by at least two different points of contact. The two different points of contact can include a pivoting joint and a locking joint. An adhesive can be disposed on or adjacent to at least one of the pivoting joint and the locking joint.

In a sixty-fourth aspect, in addition to one or more of the preceding or following aspects, or in the alternative to some aspects, the adhesive can be disposed can be an adhesive recess adjacent to the pivoting joint.

In a sixty-fifth aspect, in addition to one or more of the preceding or following aspects, or in the alternative to some aspects, the adhesive forms a water-tight seal.

In a sixty-sixth aspect, in addition to one or more of the preceding or following aspects, or in the alternative to some aspects, the locking joint can include a snap-fit mechanism.

In a sixty-seventh aspect, in addition to one or more of the preceding or following aspects, or in the alternative to some aspects, the snap-fit mechanism includes complementary portions disposed on the interior threshold subunit and the exterior sill subunit.

In a sixty-eighth aspect, in addition to one or more of the preceding or following aspects, or in the alternative to some aspects, the pivoting joint can include a receiver and a projection.

In a sixty-ninth aspect, in addition to one or more of the preceding or following aspects, or in the alternative to some aspects, at least one of the projection and the receiver can be disposed on the interior threshold subunit and the other can be disposed on the exterior sill subunit.

In a seventieth aspect, in addition to one or more of the preceding or following aspects, or in the alternative to some aspects, the pivoting joint can be disposed below the adhesive.

In a seventy-first aspect, in addition to one or more of the preceding or following aspects, or in the alternative to some aspects, the composite material can include a polymer resin and wood particles.

In a seventy-second aspect, in addition to one or more of the preceding or following aspects, or in the alternative to some aspects, the polymer resin can include polyvinylchloride.

In a seventy-third aspect, in addition to one or more of the preceding or following aspects, or in the alternative to some aspects, the composite material can include a polymer resin, wood particles, and glass fibers.

In a seventy-fourth aspect, in addition to one or more of the preceding or following aspects, or in the alternative to some aspects, the metal can be aluminum.

In a seventy-fifth aspect, in addition to one or more of the preceding or following aspects, or in the alternative to some aspects, the fenestration unit can be an entry door.

In a seventy-sixth aspect, in addition to one or more of the preceding or following aspects, or in the alternative to some aspects, the fenestration unit can be a patio door.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
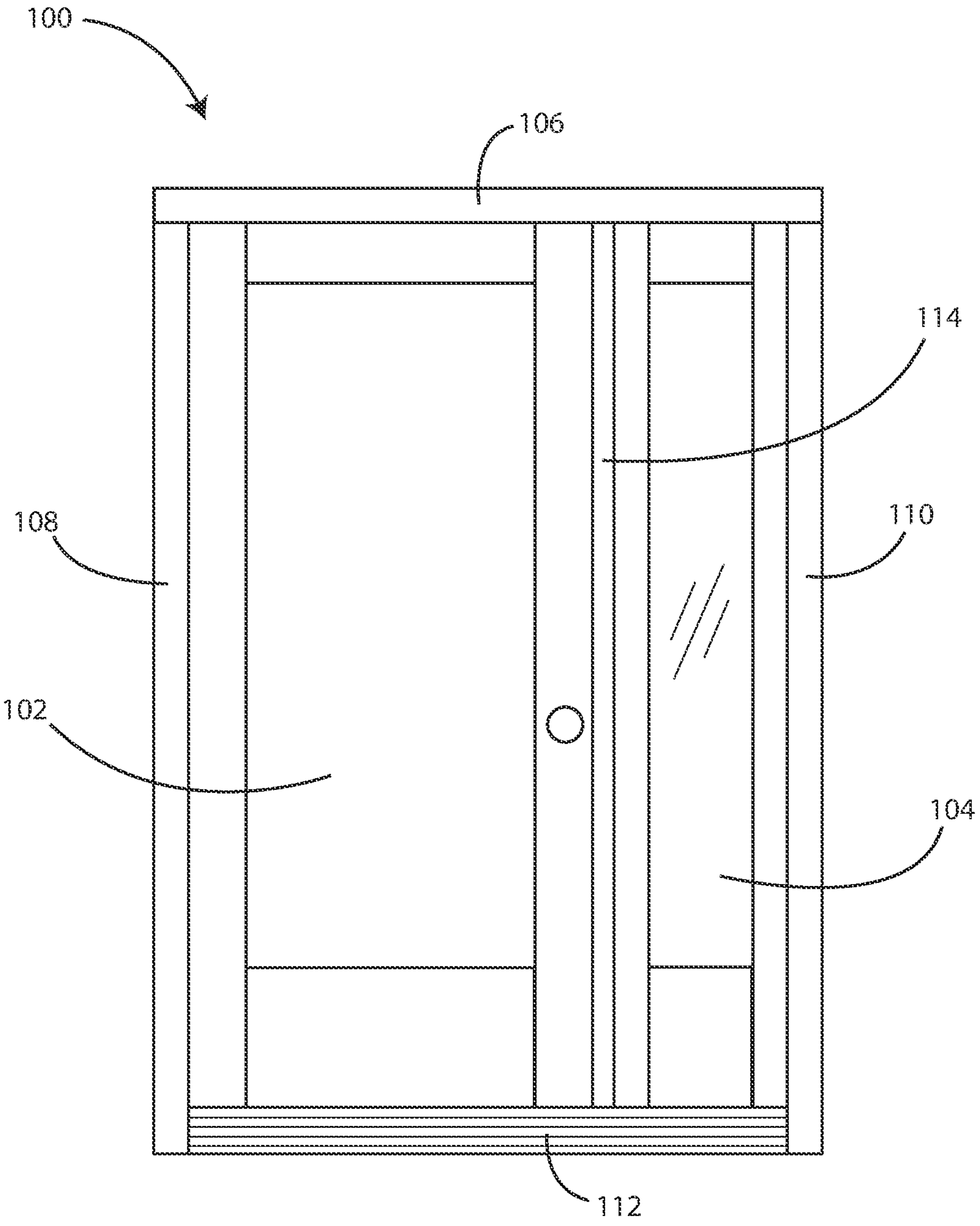
FIG. 1 is a schematic front elevation view of a fenestration unit in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As referenced above, a sill is a horizontal piece of material that sits at the bottom of a door or window opening providing structural support as part of a frame system. Many sills are one-piece structures and, in the context of a door, may typically be formed of a metal such as aluminum. Aluminum sills are durable. However, aluminum sills are generally not thermally efficient as the metal conducts heat extremely well. In addition, the use of aluminum sills can limit the types of colors or finishes to provide an aesthetic appearance. Finally, aluminum is an expensive material to use.

Embodiments herein include multi-part sill assemblies that can leverage the properties of multiple materials to create sills that maintain high strength and durability and offer benefits such as providing a thermal break for enhanced thermal efficiency, exhibit high impact resistance such as for a threshold portion, and allow for different colors and/or finishes between interior portions (wherein interior refers to the interior side of a structure) and exterior portions (wherein exterior refers to the exterior side of a structure).

In addition, embodiments of multi-part sill assemblies herein can facilitate water drainage through internal channels within the sill assembly that are rendered water-tight through internal adhesive bonding. Also, since the exterior sill subunit and the interior threshold subunit can be formed of two dissimilar materials with different coefficients of thermal expansion, the adhesive serves to prevent movement (expansion/contraction) between the two dissimilar materials which could otherwise cause gaps at the end of the parts. Such gaps at the end of the parts are undesirable as they could cause water leakage.

As an example, a multi-part sill assembly for a fenestration unit is included having an exterior sill subunit and an interior threshold subunit. The exterior sill subunit can be formed of a metal and the interior threshold subunit can be formed of a composite material. The interior threshold subunit can be joined to the exterior sill subunit through at least three different points of contact. The three different points of contact can include a pivoting joint, a locking joint, and an adhesive joint.

As another example, a multi-part sill assembly for a fenestration unit is included having an exterior sill subunit and an interior threshold subunit. The exterior sill subunit can be formed of various materials, but in some examples can be a metal. The exterior sill subunit can include a bottom projection, a first locking arm, and an adhesive distribution shelf. The interior threshold can be formed of various materials, but in some embodiments can be composite material. The interior threshold subunit can include a bottom receiving pocket, wherein the bottom receiving pocket is configured to receive the bottom projection. The interior threshold subunit can also include a second locking arm, wherein the second locking arm is configured to interlock with the first locking arm. A structural adhesive can be disposed between the adhesive distribution shelf and an inner wall surface of the interior threshold subunit to provide a water-tight seal. Other embodiments are also included herein.

Referring now to FIG. 1, a schematic front elevation view of a fenestration unit 100 is shown in accordance with various embodiments herein. The fenestration unit 100 is one example of a fenestration system or assembly herein. The fenestration unit 100 can include a door 102 along with a side lite or side panel 104. The fenestration unit 100 can include frame members such as a head jamb 106, a first side jamb 108, a second side jamb 110, and a sill assembly 112. In some embodiments, the frame members can also include a mull post 114. In this particular example, the fenestration unit 100 is an entry door. However, features described herein can also apply to other fenestrations such as patio doors and windows.

Figure 2:
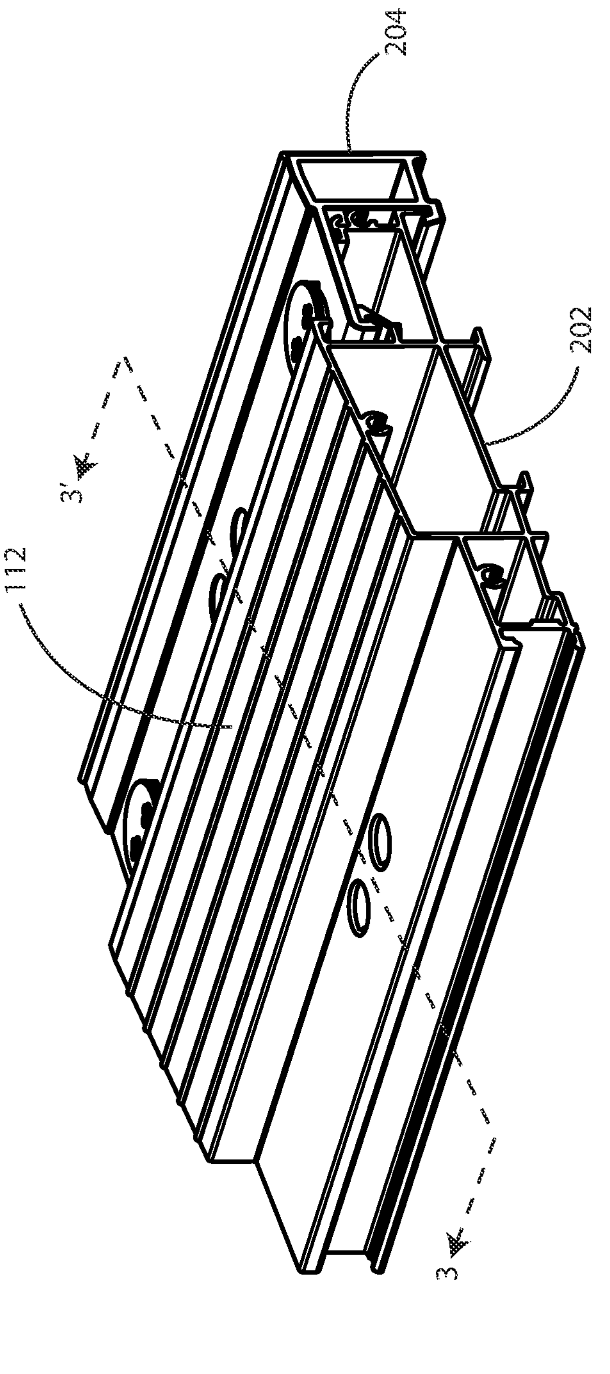
FIG. 2 is a perspective cutaway view of a sill assembly in accordance with various embodiments herein.

Referring now to FIG. 2, a perspective cutaway view of a portion of a multi-part sill assembly 112 is shown in accordance with various embodiments herein. The multi-part sill assembly 112 includes an exterior sill subunit 202 and an interior threshold subunit 204.

In various embodiments, the exterior sill subunit 202 can be formed of a metal. For example, in various embodiments the exterior sill subunit 202 can be aluminum. However, other materials can be used to form the exterior sill subunit 202 including, but not limited to, polymers, composites, and the like. In various embodiments, the interior threshold subunit 204 can be formed of a composite material. Exemplary composite materials are described in greater detail below. However, in some embodiments, the interior threshold subunit 204 can be formed of a non-composite material, such as a polymer that is not part of a composite.

Figure 3:
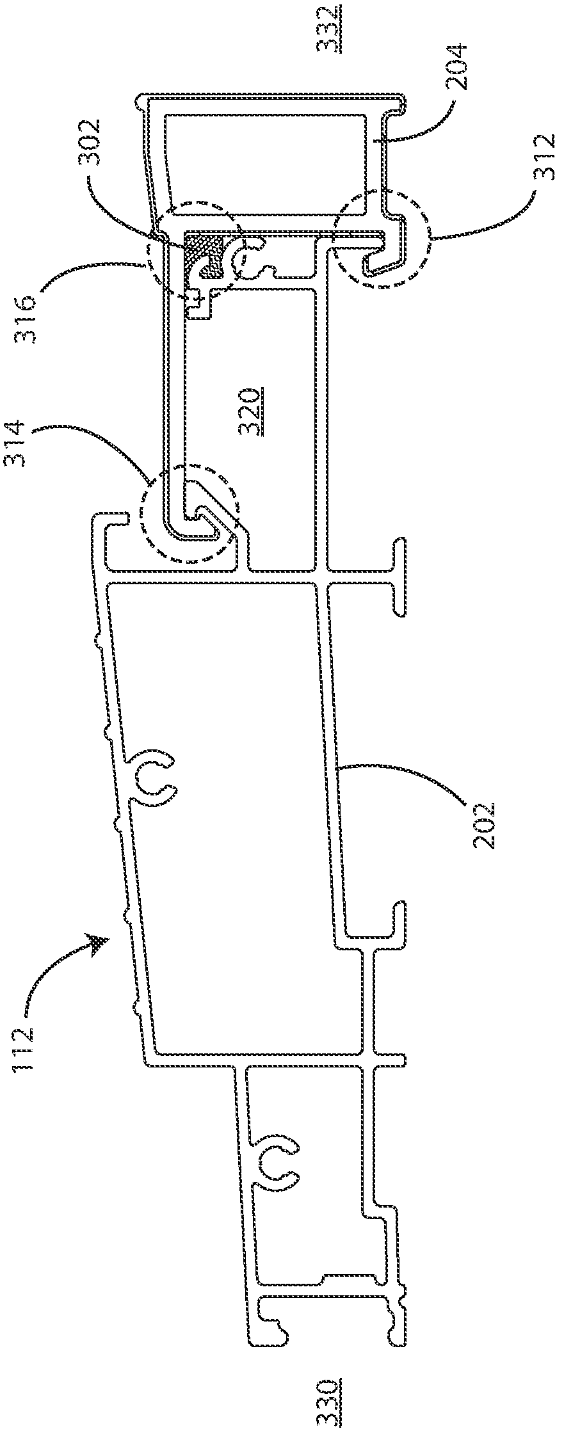
FIG. 3 is a cross-sectional view of a sill assembly as taken along line 3-3' of FIG. 2 in accordance with various embodiments herein.

Referring now to FIG. 3, a cross-sectional view of a multi-part sill assembly 112 as taken along line 3-3' of FIG. 2 is shown in accordance with various embodiments herein. As before, the multi-part sill assembly 112 includes an exterior sill subunit 202 and an interior threshold subunit 204. The multi-part sill assembly 112 also includes a structural adhesive 302. FIG. 3 also illustrates the exterior side 330 (such would correspond with the exterior of a building or structure when the sill assembly 112 is installed) of the multi-part sill assembly 112 and the interior side 332.

In various embodiments, the interior threshold subunit 204 can be joined to an exterior sill subunit 202 using at least three different points of contact. In this example, the three different points of contact can include a pivoting joint 312 (or interface), a locking joint 314 (or interface), and an adhesive joint 316 (or interface). However, in some embodiments additional points of contact and/or additional joints can be used. In some embodiments, different combinations of joints can be used such as two locking joints and an adhesive joint.

In this example, (and as described below with respect to FIG. 7), the interior threshold subunit 204 can be brought into contact with exterior sill subunit 202 to form the pivoting joint 312 and then the interior threshold subunit 204 can be pivoted until portions of the interior threshold subunit 204 and the exterior sill subunit 202 interlock forming the locking joint. The pivoting action can also cause the structural adhesive 302 to be distributed between a portion of the exterior sill subunit 202 and the interior threshold subunit 204 forming the adhesive joint 316.

In various embodiments, the pivoting joint 312 can include a receiver and a projection or other structures to facilitate formation of a pivoting joint. In some embodiments, the receiver and the projection can take the form of complementary hooks, or socket and ball, or groove and tongue, or other structures that engage one another and still allow for rotation. In various embodiments, at least one of the pivoting joint structures are disposed on the interior threshold subunit 204 and the other can be disposed on the exterior sill subunit 202.

In some embodiments, the locking joint can include any two complementary structures that can mechanically lock together. By way of example, the locking joint and include a snap-fit mechanism. In various embodiments, the snap-fit mechanism includes complementary portions disposed on the interior threshold subunit 204 and the exterior sill subunit 202.

In the embodiment shown, the adhesive joint 316 is positioned above the pivoting joint 312 and both the adhesive joint 316 and the pivoting joint 312 are positioned to the interior side of the multi-part sill assembly 112 with respect to the locking joint 314.

However, in some embodiments, the positions of the pivoting joint 312 and the locking joint 314 can be reversed. As such, the pivoting joint 312 can be disposed at an exterior position relative to the adhesive joint 316 and the locking joint 314 can be disposed below the adhesive joint 316. In such a configuration, the pivoting joint 312 can be adjacent a top of the multi-part sill assembly 112.

In various embodiments, the structural adhesive 302 can be disposed between an adhesive distribution shelf (described further below) and an inner wall surface of the interior threshold subunit 204 to form the adhesive joint 316. In various embodiments, the structural adhesive 302 forms a water-tight seal. In various embodiments, the structural adhesive 302 specifically forms a water-tight seal between an adhesive distribution shelf (described further below) and an inner wall surface of the interior threshold subunit 204. As such, the structural adhesive 302 can aid in forming a water flow channel 320 (or inner cavity) within the multi-part sill assembly 112. The water flow channel 320 can be formed between the interior threshold subunit 204 and the exterior sill subunit 202 after they are joined. For example, the interior threshold subunit 204 and the exterior sill subunit 202 can each define a portion of the water flow channel 320. The adhesive joint 316 can be a water-tight joint to prevent water from exiting the water flow channel 320 at the position of the adhesive joint 316.

Figure 4:
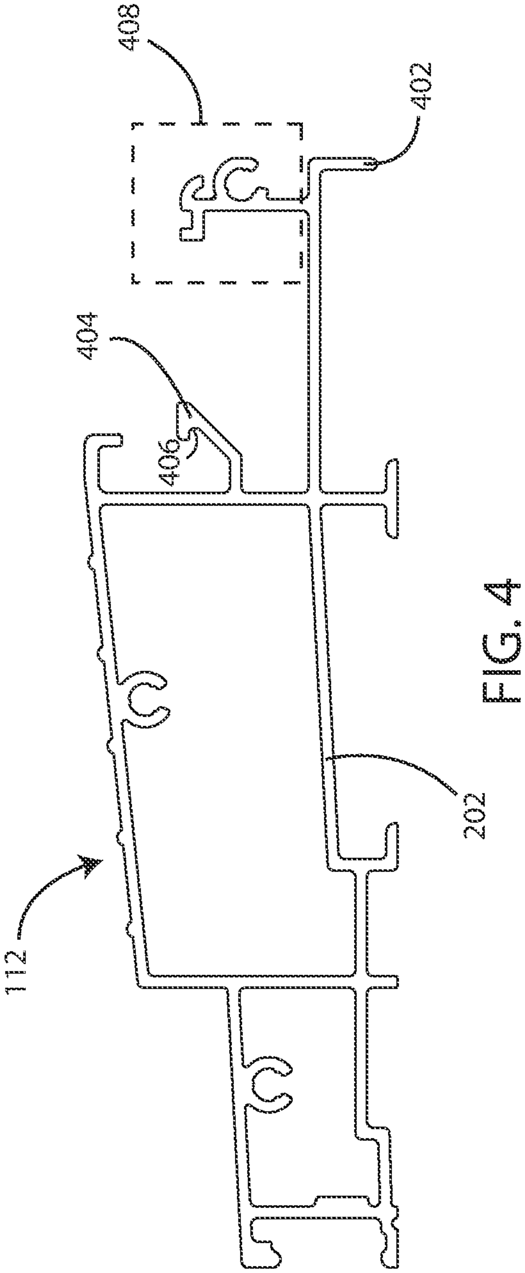
FIG. 4 is a cross-sectional view of exterior sill subunit in accordance with various embodiments herein.

Referring now to FIG. 4, a cross-sectional view of exterior sill subunit 202 is shown in accordance with various embodiments herein. The exterior sill subunit 202 can include a structure to form part of the pivoting joint that is formed. For example, the exterior sill subunit 202 can include bottom projection 402. The exterior sill subunit 202 can also include a structure to form part of the locking joint that is formed. In this example, the exterior sill subunit 202 can include a first locking arm 404 and a receiving pocket 406. In some embodiments, the first locking arm 404 can be part of a snap-fit mechanism. For example, the first locking arm 404 can define a protruding edge and/or a receiving cavity to form a snap-fit joint along with a complementary structure disposed on the interior threshold subunit. FIG. 4 also shows a detail area 408 that will be described with respect to FIG. 5.

Figure 5:
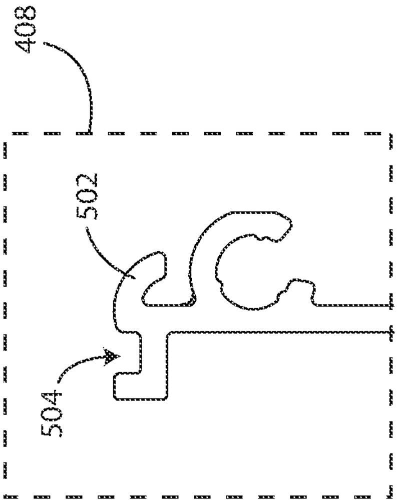
FIG. 5 is a cross-sectional view of a portion of an exterior sill subunit in accordance with various embodiments herein.

Referring now to FIG. 5, a cross-sectional view of a detail area 408 of an exterior sill subunit is shown in accordance with various embodiments herein. The detail area 408 of the exterior sill subunit includes an adhesive distribution shelf 502. The adhesive distribution shelf 502 can function to guide movement of the adhesive as the exterior sill subunit and the interior threshold subunit come into position with one another and an adhesive joint is formed with the adhesive disposed between an adhesive distribution shelf 502 and a surface of an interior threshold subunit.

In various embodiments, the adhesive distribution shelf 502 can be curved. In various embodiments, the adhesive distribution shelf 502 can be curved downward in an interior direction, such as towards the interior side of the multi-part sill assembly. While not intending to be bound by theory, it has been found that such a shape can guide movement of the adhesive in a manner so as to allow thicker or thinner beads of adhesive (e.g., greater or lesser amounts of adhesive) such as may be applied to a surface of the interior threshold subunit to form a consistent seal that is water tight.

It can be undesirable to allow excess adhesive to fall into the water flow channel 320 (shown in FIG. 3). As such, in some embodiments, the exterior sill subunit also includes an adhesive retention channel 504. The adhesive retention channel 504 can be adjacent the adhesive distribution shelf 502. The adhesive retention channel 504 can function to catch excess amount of adhesive to prevent them from falling into the water flow channel 320 (shown in FIG. 3).

Figure 6:
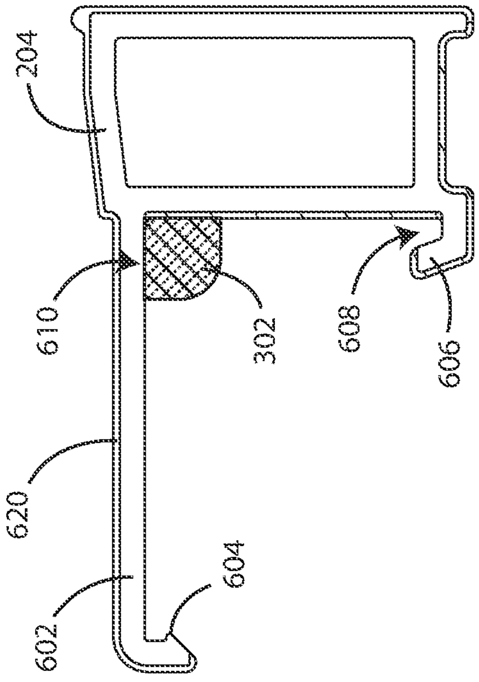
FIG. 6 is a cross-sectional view of an interior threshold subunit in accordance with various embodiments herein.

Referring now to FIG. 6, a cross-sectional view of an interior threshold subunit 204 is shown in accordance with various embodiments herein. The interior threshold subunit 204 can include a second locking arm 602. The second locking arm 602 can include a protruding edge 604. The second locking arm 602 can interface with the first locking arm of the exterior sill subunit to form a locking joint. For example, the second locking arm 602 can be configured to interlock with a first locking arm 404.

The interior threshold subunit 204 also includes a pocket wall 606 which at least partially defines a bottom receiving pocket 608. In various embodiments, the bottom receiving pocket 608 can be configured to receive a bottom projection 402 forming a rotating joint.

The interior threshold subunit 204 also includes an inner wall surface 610. The structural adhesive 302 can applied to the inner wall surface 610, such as at an interior corner.

In some embodiments, the interior threshold subunit 204 also includes a capstock layer 620. In various embodiments, the capstock layer 620 can be disposed over outer surfaces of an interior threshold subunit 204. The capstock layer 620 can be formed of a polymer and/or a polymer containing composite material and, in some embodiments, can be formed through a coextrusion process.

Figure 7:
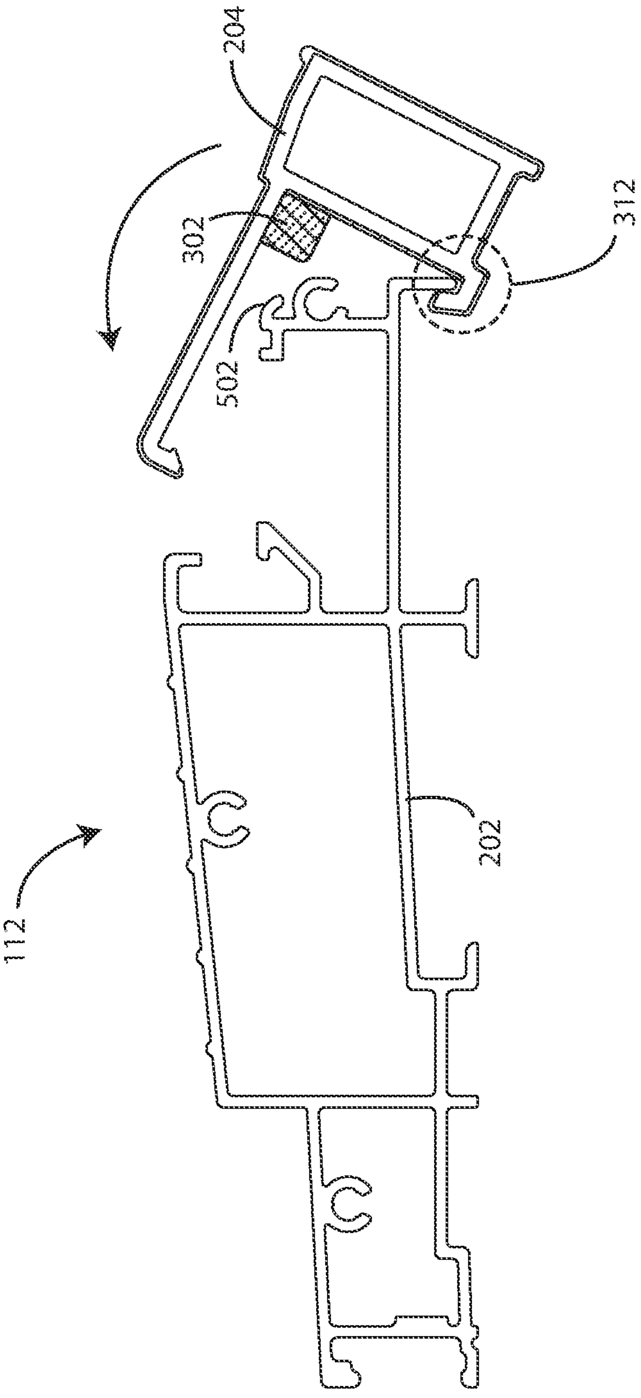
FIG. 7 is a cross-sectional view of a sill assembly during manufacturing in accordance with various embodiments herein.

The exterior sill subunit and interior threshold subunit can be attached together during the manufacturing process in various ways. Referring now to FIG. 7, a cross-sectional view of a multi-part sill assembly 112 during manufacturing is shown in accordance with various embodiments herein. As before, the multi-part sill assembly 112 includes an exterior sill subunit 202 and an interior threshold subunit 204. The multi-part sill assembly 112 also includes a structural adhesive 302. The exterior sill subunit 202 includes an adhesive distribution shelf 502.

The interior threshold subunit 204 can be brought into contact with exterior sill subunit 202 to form the pivoting joint 312 and then the interior threshold subunit 204 can be pivoted upward and toward the exterior until portions of the interior threshold subunit 204 and the exterior sill subunit 202 interlock forming the locking joint (shown in FIG. 3). The pivoting action can also cause the structural adhesive 302 to be distributed between the adhesive distribution shelf 502 of the exterior sill subunit 202 and a wall surface of the interior threshold subunit 204 forming the adhesive joint (shown in FIG. 3).

Figure 8:
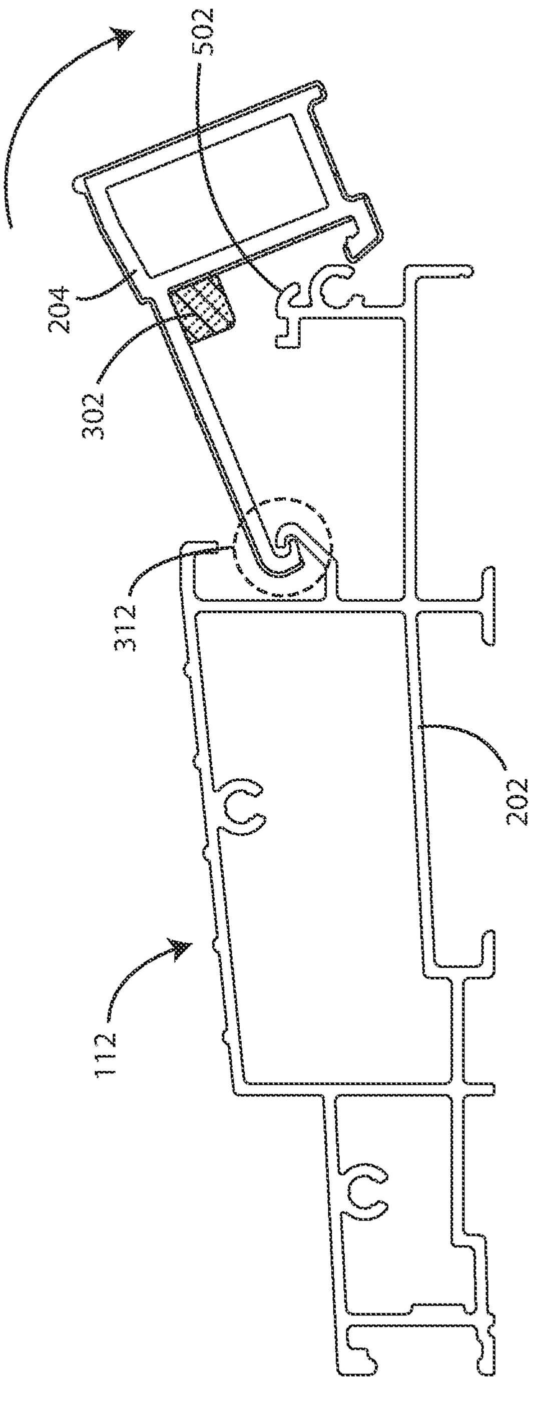
FIG. 8 is a cross-sectional view of a sill assembly during manufacturing in accordance with various embodiments herein.

As described previously, however, the positions of the locking joint and the pivoting joint can be reversed. This generally results in the interior threshold subunit 204 rotating differently during the manufacturing process. By way of example, referring now to FIG. 8, a cross-sectional view of a multi-part sill assembly 112 during manufacturing is shown in accordance with various embodiments herein. As before, the multi-part sill assembly 112 includes an exterior sill subunit 202 and an interior threshold subunit 204. The multi-part sill assembly 112 also includes a structural adhesive 302. The exterior sill subunit 202 includes an adhesive distribution shelf 502.

In this alternative configuration, the interior threshold subunit 204 can be brought into contact with exterior sill subunit 202 to form the pivoting joint 312 and then the interior threshold subunit 204 can be pivoted downward and toward the interior until portions of the interior threshold subunit 204 and the exterior sill subunit 202 interlock forming the locking joint.

Figure 9:
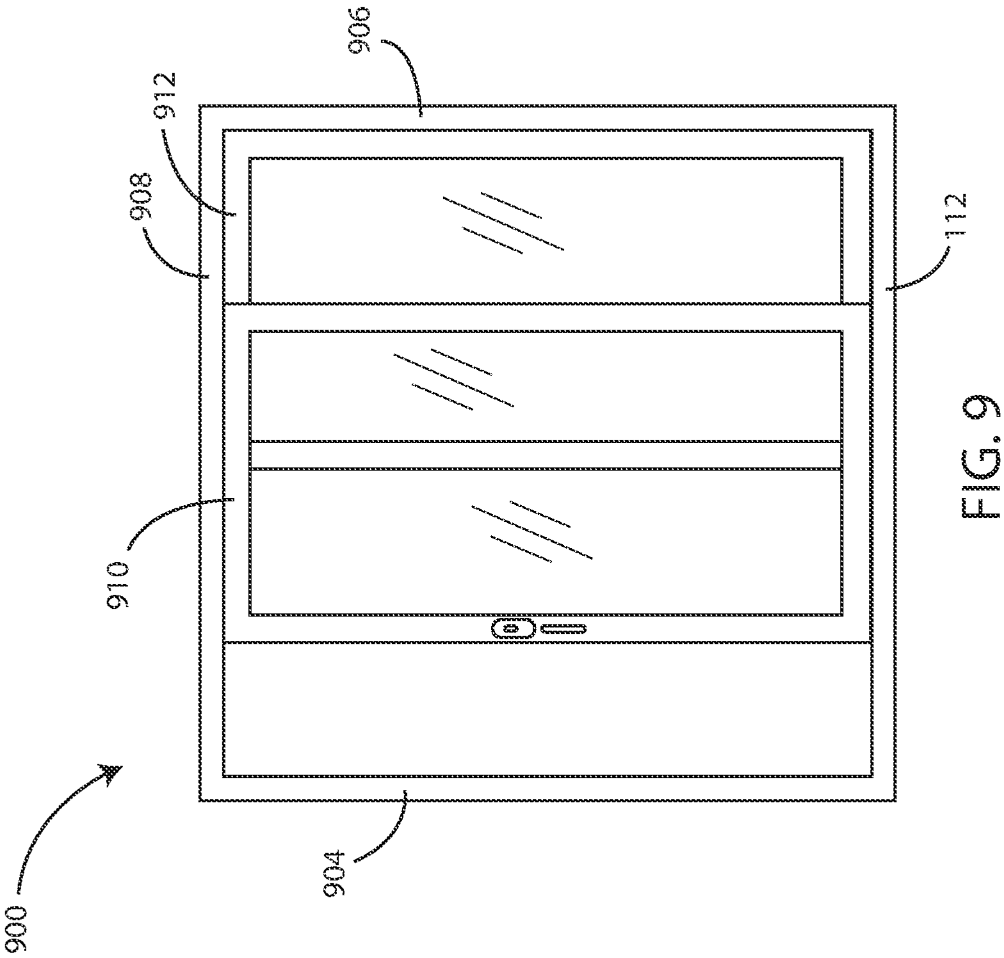
FIG. 9 is a schematic front elevation view of another type of fenestration unit in accordance with various embodiments herein.

Beyond entry door systems, other types of fenestrations can include features as described herein. For example, referring now to FIG. 9, a schematic front elevation view is shown of another type of fenestration unit in accordance with various embodiments herein. In specific, FIG. 9, shows a schematic front elevation view of patio door 900 in accordance with various embodiments herein. The patio door 900 includes frame members such as a sill assembly 112, a first jamb 904, a second jamb 906, and a head jamb 908. The patio door 900 also includes a sliding door panel 910 and a fixed door panel 912.

The sill assembly 112 can specifically be a multi-part sill assembly as described elsewhere herein. By way of example, the sill assembly 112 of the patio door 900 can include an exterior sill subunit 202 and an interior threshold subunit 204 that interlock as described herein.

In some embodiments, the adhesive joint can be integrated with at least one of the pivoting joint and the locking joint. As such, in some embodiments, the interior threshold subunit can be joined to the exterior sill subunit by at least two different points of contact, the two different points of contact including a pivoting joint and a locking joint. An adhesive can be disposed on or adjacent to at least one of the pivoting joint and the locking joint.

Figure 10:
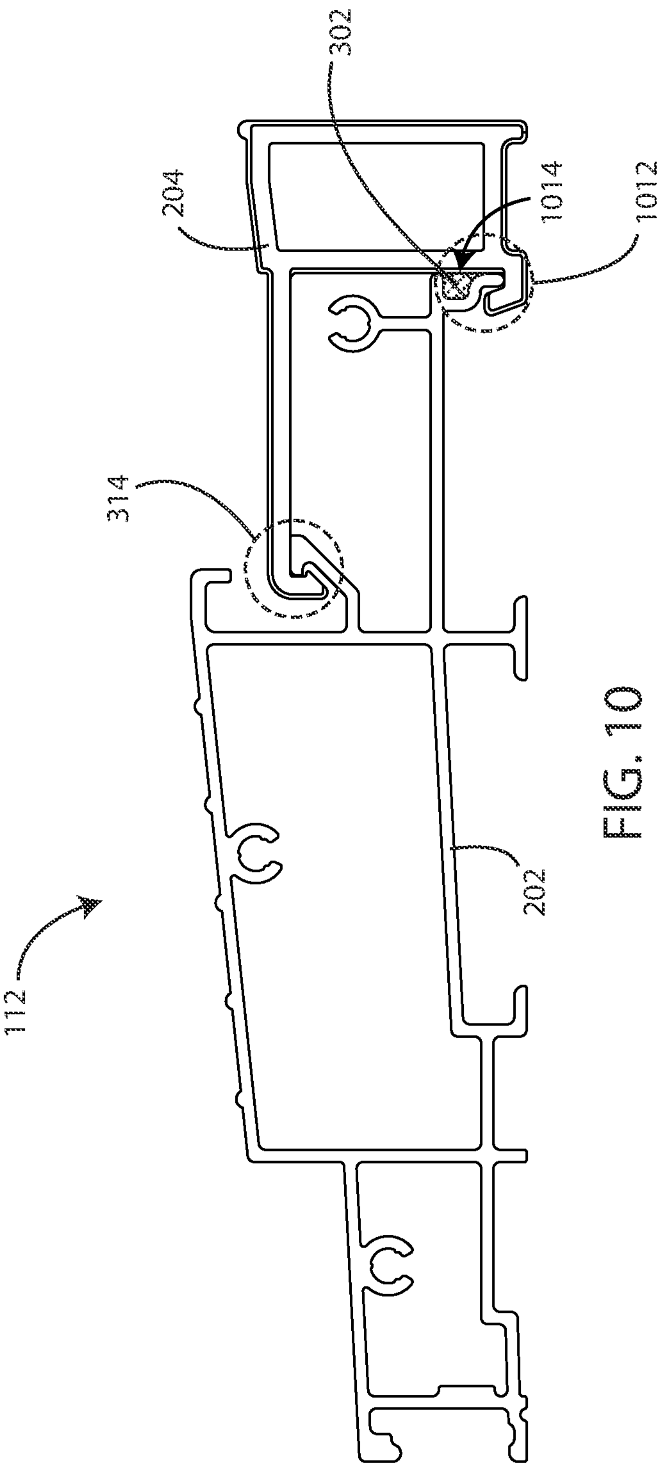
FIG. 10 is a cross-sectional view of a sill assembly in accordance with various embodiments herein.

Referring now to FIG. 10, a cross-sectional view of a multi-part sill assembly 112 is shown in accordance with various embodiments herein. The multi-part sill assembly 112 includes an exterior sill subunit 202 and interior threshold subunit 204. The multi-part sill assembly 112 includes a locking joint 314 and a pivoting joint 1012. A structural adhesive 302 is disposed adjacent the pivoting joint 1012 in an adhesive recess 1014 formed in the exterior sill subunit 202.

Methods

Many different methods are contemplated herein, including, but not limited to, methods of making, methods of using, and the like. Aspects of system/device operation described elsewhere herein can be performed as operations of one or more methods in accordance with various embodiments herein.

In an embodiment, a method of assembling a multi-part sill assembly for a fenestration unit is included. The method can include contacting a bottom portion of an interior threshold subunit with a bottom portion of an exterior sill subunit and rotating the interior threshold subunit with respect to the exterior sill subunit (such as rotating up and to the exterior side) sufficiently far for a locking portion on the interior threshold subunit to engage with a locking portion on the exterior sill subunit and cause an adhesive to spread along an adhesive distribution shelf on the interior threshold subunit.

However, in some embodiments, positions of parts can be reversed, such as the position of components for the pivoting joint. As such, in some embodiments the method can include contacting a top portion of an interior threshold subunit with a top portion of an exterior sill subunit and rotating the interior threshold subunit with respect to the exterior sill subunit (such as rotating down and to the interior side) sufficiently far for a locking portion on the interior threshold subunit to engage with a locking portion on the exterior sill subunit and cause an adhesive to spread along an adhesive distribution shelf on the interior threshold subunit.

In an embodiment, the method can further include applying the adhesive to an interior surface of the interior threshold subunit prior to the step of contacting a bottom portion of the interior threshold subunit with a bottom portion of the exterior sill subunit.

In an embodiment, the method can further include collecting excess adhesive spreading to the exterior side in an adhesive retention channel.

Composite Materials

Various embodiments herein include a composite materials. Further details about the composite materials are provided as follows. However, it will be appreciated that this is merely provided by way of example and that further variations are contemplated herein.

Composites used herein (including, for example, those used for the interior threshold subunit) can include a polymer resin. As used herein, the term “resin” shall refer to the thermoplastic polymer content of the composition. The resin portion of the composition excludes any polymer content provided by processing aids, which can also be used.

Polymer resins used with embodiments herein can include various types of polymers including, but not limited to, addition polymers, condensation polymers, natural polymers, treated polymers, and thermoplastic resins.

Thermoplastic resins herein can include addition polymers including poly alpha-olefins, polyethylene, polypropylene, poly 4-methyl-pentene-1, ethylene/vinyl copolymers, ethylene vinyl acetate copolymers, ethylene acrylic acid copolymers, ethylene methacrylate copolymers, ethylmethylacrylate copolymers, etc.; thermoplastic propylene polymers such as polypropylene, ethylene-propylene copolymers, etc.; vinyl chloride polymers and copolymers; vinylidene chloride polymers and copolymers; polyvinyl alcohols, acrylic polymers made from acrylic acid, methacrylic acid, methylacrylate, methacrylate, acrylamide and others. Fluorocarbon resins such as polytetrafluoroethylene, polyvinylidiene fluoride, and fluorinated ethylene-propylene resins. Styrene resins such as a polystyrene, alpha-methylstyrene, high impact polystyrene acrylonitrile-butadiene-styrene polymers.

A variety of condensation polymers can also be used in the manufacture of the composites herein including nylon (polyamide) resins such as nylon 6, nylon 66, nylon 10, nylon 11, nylon 12, etc. A variety of polyester materials can be made from dibasic aliphatic and aromatic carboxylic acids and di- or triols. Representative examples include polyethylene-terephthalate, polybutylene terephthalate and others.

Polycarbonates can also be used in the polymeric resin. Such polycarbonates are long chained linear polyesters of carbonic acid and dihydric phenols typically made by reacting phosgene ($COCl_2$) with bisphenol A resulting in transparent, tough, dimensionally stable plastics. A variety of other condensation polymers are used including polyetherimide, polysulfone, polyethersulfone, polybenzazoles, aromatic polysulfones, polyphenylene oxides, polyether ether ketone, and others.

Poly(vinyl chloride) can be used as a homopolymer, but can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile; alpha-olefins such as ethylene, propylene, etc.; chlorinated monomers such as vinylidene chloride, chlorinated polyethylene, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

In some embodiments, poly(vinyl chloride) polymers having an average molecular weight (Mn) of about 40,000 to about 140,000 (90,000+/−50,000) can be used. In some embodiments, poly(vinyl chloride) polymers having an average molecular weight (Mn) of about 78,000 to about 98,000 (88,000+/−10,000) can be used.

In some embodiments, poly(vinyl chloride) polymers used herein can have an inherent viscosity (IV-ASTM D-5225) of about 0.68 to about 1.09. In some embodiments, poly(vinyl chloride) polymers used herein can have an inherent viscosity of about 0.88 to about 0.92.

In some embodiments, poly(vinyl chloride) polymers used herein can have a glass transition temperature (Tg) of about 70 to about 80 degrees.

Poly(vinyl chloride) polymers are available from many sources under various tradenames including, but not limited to, Oxy Vinyl, Vista 5385 Resin, Shintech SE-950EG and Oxy Vinyl 225G, among others.

In some embodiments, polypropylene having a melt flow rate (g/10 min) (ASTM D1238, 230 C) of 0.5 to 75.0 can be used. In some embodiments, polypropylene having a glass transition temperature (Tg) of about 0 to about 20 degrees Celsius can be used.

In some embodiments, polyethylene terephthalate (PET) having an intrinsic viscosity (IV) (Dl/g) of about 0.76 to about 0.9 can be used. In some embodiments, polyethylene terephthalate (PET) having a glass transition temperature (Tg) of about 70 to about 80 degrees Celsius can be used. In some embodiments, glycol modified polyethylene terephthalate (PETG) having a glass transition temperature (Tg) of about 78-82 degrees Celsius can be used.

In some embodiments, polybutylene terephthalate (PBT) having a melt flow rate (g/10 min) (ASTM D1238, 1.2 kg, 250 C) of 100 to 130 can be used. In some embodiments, polybutylene terephthalate (PBT) having a glass transition temperature (Tg) of about 45 to about 85 degrees Celsius can be used.

Polymer blends or polymer alloys can be used herein. Such alloys can include two miscible polymers blended to form a uniform composition. A polymer alloy at equilibrium comprises a mixture of two amorphous polymers existing as a single phase of intimately mixed segments of the two macro molecular components. Miscible amorphous polymers can form glasses upon sufficient cooling and a homogeneous or miscible polymer blend can exhibit a single, composition dependent glass transition temperature (Tg). An immiscible or non-alloyed blend of polymers typically displays two or more glass transition temperatures associated with immiscible polymer phases.

Polymeric resin materials herein can retain sufficient thermoplastic properties to permit melt blending with fiber, to permit formation of extruded articles or other extrudates such as pellets, and to permit the composition material or pellet to be extruded in a thermoplastic process or in conjunction with a pultrusion process.

In some embodiments, polymer resins herein can include extrusion grade polymer resins. In some embodiments, polymer resins herein can include resins other than extrusion grade polymer resins, including, but not limited to, injection molding grade resins. Polymer resins used herein can include non-degradable polymers. Non-degradable polymers can include those that lack hydrolytically labile bonds (such as esters, orthoesters, anhydrides and amides) within the polymeric backbone. Non-degradable polymers can also include those for which degradation is not mediated at least partially by a biological system. In some embodiments, polymers that are otherwise degradable can be made to be non-degradable through the use of stabilizing agents that prevent substantial break down of the polymeric backbone.

Polymer resins herein can include those derived from renewable resources as well as those derived from non-renewable resources. Polymers derived from petroleum are generally considered to be derived from non-renewable resources. However, polymers that can be derived from biomass are generally considered to be derived from renewable resources. Polymer resins can specifically include polyesters (or biopolyesters) derived from renewable resources, including, but not limited to polyhydroxybutyrate, polylactic acid (PLA or polylactide), and the like. Such polymers can be used as homopolymer and/or copolymers including the same as subunits. Polymer resins herein can specifically include extrusion grade polymers.

Composites used herein can also include particles. Particles can include both organic and inorganic particles. Such particles can be roughly spherical, semi-spherical, block-like, flat, needle-like (acicular), plate-like (platy), flake-like (flaky), or other shape forms. Particles herein can have substantial variation. As such, the particles added to compositions in some embodiments can form a heterogeneous mixture of particles. In other embodiments, the particles can be substantially homogeneous.

In some embodiments, the particles used with compositions herein can have an aspect ratio of between about 15:1 and about 1:1. Such aspect ratios can be assessed by first taking the largest dimension of the particle (major axis) and then comparing it with the next largest dimension of the particle that is perpendicular to the major axis. In various embodiments, the particles can be, on average, from about 0.01 mm to about 8 mm in their largest dimension (or major axis or characteristic dimension).

Particles herein can include materials such as polymers, carbon, organic materials, inorganic materials, composites, or the like, and combinations of these. Polymers for the particles can include both thermoset and thermoplastic polymers. Inorganic particle materials can include, but are not limited to silicates. Inorganic particle materials can specifically include, but are not limited to, glass beads, glass bubbles, minerals such as mica and talc, and the like.

Particles herein can specifically include organic particles. Particles herein can specifically include particles comprising substantial portions of lignin, hemicellulose and cellulose (lignocellulosic materials), such as wood particles or wood flour. Wood particles can be derived from hardwoods or softwoods. In various embodiments, the wood particles can have a moisture content of less than about 8, 6, 4, or 2 percent.

In various embodiments, the wood particles can be a heterogeneous mixture of wood particles, wherein at least about 50, 60, 70, 80, 90, or 95 weight percent of the particles are 80 Mesh or larger (or 80 sieve size—corresponding to a pore size of 0.177 mm and a particle size of approximately 0.180 mm).

Other biomaterials or other organic materials may also be used as particles. As used herein, the term "biomaterial" will refer to materials of biological origin, such as wood fiber, hemp, kenaf, bamboo, rice hulls, and nutshells. More generally, other lignocellulose materials resulting from agricultural crops and their residues may also be used as particles.

In some embodiments, particles herein can include inorganic materials such as metal oxide particles or spheres, glass particles, or other like materials. These particles may be used either alone or in combination with other organic or inorganic particles.

Particles used herein can include newly synthesized or virgin materials as well as recycled or reclaimed materials or portions of recycled materials. In some embodiments, reclaim streams can be from the composition herein or from other extrusion, molding, or pultrusion compositions. As such, in some embodiments particles herein can include portions of multiple materials.

In some embodiments, the particles used herein can include a single particle type in terms of material and dimensions, and in other embodiments can include a mixture of different particle types and/or fiber dimensions. In some embodiments, the particles used herein can include a first particle type and/or size in combination with a second particle type and/or size.

In various embodiments, particles used herein can be coated with a material. By way of example, particles can be coated with a lubricant, a tie layer, or other type of compound.

The amount of the particles used in the composition can vary based on the application. In some embodiments, the amount of particles in the composition can be greater than or equal to about 1, 2, 4, 6, 8, 10, 15, 20, 25, or 30 wt. % or more (calculated based on the weight of the particles as a percent of the total weight of the extruded composition in which the particles are disposed). In some embodiments, the amount of particles in the composition can be less than or equal to about 80, 75, 70, 65, 60, 55, 50, 45, 40, 35, 30, 25, 20, 15, 10, or 5 weight percent. In some embodiments, the amount of particles can be in a range wherein each of the foregoing numbers and serve as the upper or lower bound of the range provided that the upper bound is larger than the lower bound.

Composites used herein can also include fibers. Fibers used herein can include fibers of various types and in various amounts. By way of example, fibers used in embodiments herein can include materials such as glasses, polymers, ceramics, metals, carbon, basalt, composites, or the like, and combinations of these. Exemplary glasses for use as fibers can include, but are not limited to, silicate fibers and, in particular, silica glasses, borosilicate glasses, alumino-silicate glasses, alumino-borosilicate glasses and the like. Exemplary glass fibers can also include those made from A-glass, AR-glass, D-glass, E-glass with boron, E-glass without boron, ECR glass, S-glass, T-glass, R-glass, and variants of all of these. Exemplary glass fibers include 415A-14C glass fibers, commercially available from Owens Corning. However, exemplary fibers can include cellulosic and/or lignocellulosic fibers.

Exemplary polymers for use as fibers can include, but are not limited to, both natural and synthetic polymers. Polymers for fibers can include thermosets as well as thermoplastics with relatively high melt temperatures, such as 210 degrees Celsius or higher.

Natural fibers that can be used in the invention include fibers derived from jute, flax, hemp, ramie, cotton, kapok, coconut, palm leaf, sisal, and others.

Synthetic fibers that can be used in the manufacture of the composites herein include cellulose acetate, acrylic fibers such as acrylonitrile, methylmethacrylate fibers, methylacrylate fibers, and a variety of other basic acrylic materials including homopolymers and copolymers of a variety of acrylic monomers, aramid fibers which comprise polyamides having about 85% or more of amide linkages directly attached to two aromatic rings, nylon fibers, polyvinylidene dinitryl polymers. Polyester including polyethylene terephthalate, polybutylene terephthalate, polyethylene naphthalate, RAYON, polyvinylidene chloride, spandex materials such as known segmented polyurethane thermoplastic elastomers, vinyl alcohol, and modified polyvinyl alcohol polymers and others.

Fibers used herein can include newly synthesized or virgin materials as well as recycled materials or portions of recycled materials.

In some embodiments, the material of the fibers can be organic in nature. In other embodiments, the material of the fibers can be inorganic in nature. Fibers can be carbon fibers, basalt fibers, cellulosic fibers, ligno-cellulosic fibers, silicate fibers, boron fibers, and the like. Exemplary metal fibers that can be used herein can include steel, stainless steel, aluminum, titanium, copper and others.

Fibers used herein can have various tensile strengths. Tensile strength can be measured in various ways, such as in accordance with ASTM D2101. In some embodiments, the tensile strength of fibers used herein can be greater than or equal to about 1000, 1500, 2000, 2500, or 3000 MPa. In some embodiments, the tensile strength of fibers herein can be less than about 5000 MPa.

Fibers herein can include those having various dimensions. Fibers used herein can have an average diameter greater than or equal to about 1, 2, 3, 4, 5, 10, 15, 20, 25, 30, 35, 40, 45, 50, 100, 200, 300, or 500 microns. In some embodiments, fibers used herein can have an average diameter of less than or equal to about 1000, 900, 800, 700, 600, 500, 400, 300, 200, 100, or 50 microns. In various embodiments, the average diameter of fibers used herein can be in a range wherein any of the foregoing diameters can serve as the upper or lower bound of the range, provided that the upper bound is greater than the lower bound. In some embodiments, the average diameter of the fibers used herein can be from 2 microns to 50 microns. In some embodiments, the average diameter of the fibers used herein can be from 10 microns to 20 microns.

Fibers used herein can have an average length of greater than or equal to about 0.1, 0.2, 0.4, 0.6, 0.8, 1, 2, 3, 4, 6, 8, 10, 12, 14, 16, 18, 20, 30, 40, 50, or 100 millimeters in length. In some embodiments, fibers used herein can have an average length of less than or equal to about 150, 100, 90, 80, 70, 60, 50, 40, 30 20, 10, 8, 5, 4, 3, or 2 millimeters. In various embodiments, the average length of fibers used herein can be in a range where any of the foregoing lengths can serve as the upper or lower bound of the range, provided that the upper bound is greater than the lower bound. In some embodiments, the average lengths of the fibers used herein can be from 0.2 millimeters to 10 millimeters. In some embodiments, the average lengths of the fibers used herein can be from 2 millimeters to 8 millimeters. It will be appreciated that fiber breakage typically occurs as a result of shear forces within the extruder. Therefore, the foregoing lengths can be as measured prior to compounding and/or extruding steps or after compounding and/or extruding steps such as in the finished extrudate.

Fibers herein can also be characterized by their aspect ratio, wherein the aspect ratio is the ratio of the length to the diameter. In some embodiments, fibers herein can include those having an aspect ratio of about 10,000:1 to about 1:1. In some embodiments, fibers herein can include those having an aspect ratio of about 5,000:1 to about 1:1. In some embodiments, fibers herein can include those having an aspect ratio of about 600:1 to about 2:1. In some embodiments, fibers herein can include those having an aspect ratio of about 500:1 to about 4:1. In some embodiments, fibers herein can include those having an aspect ratio of about 400:1 to about 15:1. In some embodiments, fibers herein can include those having an aspect ratio of about 350:1 to about 25:1. In some embodiments, fibers herein can include those having an aspect ratio of about 300:1 to about 50:1.

In some embodiments, the fibers used herein can include a single fiber type in terms of material and dimensions and in other embodiments can include a mixture of different fiber types and/or fiber dimensions. In some embodiments, the fibers used herein can include a first fiber type and/or size in combination with a second fiber type and/or size.

In various embodiments, fibers used herein can be coated with a material. By way of example, fibers can be coated with a lubricant, a tie layer, or other type of compound.

The amount of the fibers used in a composition (such as a first composition) can vary based on the application. In some embodiments, the amount of fibers in the composition can be greater than or equal to about 1, 2, 4, 6, 8, 10, 15, 20, 25, 30, 40, 50, 60, 70, or even 80 wt. % (calculated based on the weight of the fibers as a percent of the total weight of the extruded composition in which the fibers are disposed). In some embodiments, the amount of fibers in extruded composition can be less than or equal to about 90, 80, 75, 70, 65, 60, 55, 50, 45, 40, 35, 30, 25, 20, or 15 weight percent. In some embodiments, the amount of fibers in the extruded composition can be in a range wherein each of the foregoing numbers can serve as the upper or lower bounds of the range provided that the upper bound is larger than the lower bound.

Composites herein can also include various other components including, but not limited to, impact modifiers, process aids, stabilizers, and the like. Examples of process aids include acrylic processing aids, waxes, such as paraffin wax, stearates, such as calcium stearate and glycerol monostearate, and polymeric materials, such as oxidized polyethylene. Various types of stabilizers can also be included herein such as UV stabilizers, lead, tin and mixed metal stabilizers, and the like. Exemplary processing aids can include a process aid that acts as a metal release agent and possible stabilizer available under the trade designation XL-623 (paraffin, montan and fatty acid ester wax mixture) from Amerilubes, LLC of Charlotte, N.C. Calcium stearate is another suitable processing aid that can be used as a lubricant. Typical amounts for such processing aids can range from 0 to 20 wt. % based on the total weight of the composition, depending on the melt characteristics of the formulation that is desired. In some embodiments, the amount of processing aids is from 2 to 14 wt. %. In some embodiments, the amount of processing aids (as measured in parts per hundred resin) can range from 0 to 40 phr, 0.5 to 30 phr, or 0.5 to 20 phr.

Examples of other components that can be included are calcium carbonate, titanium dioxide, pigments, and the like.

Adhesives

Various adhesives can be used herein. In some embodiments, the adhesive is a structural adhesive. In some embodiments, the adhesive is a high-modulus, structural adhesive. High modulus refers to aspects of rigidity of the adhesive in a cured state. In specific, a high modulus adhesive is a type of adhesive that has a high level of stiffness or resistance to deformation when force is applied, maintaining its shape and strength under load. Structural adhesives can include those capable of bearing high loads (such as >1000 psi overlap shear strength). Exemplary adhesives herein can include epoxies, urethanes, and acrylics, amongst others.

In various embodiments the adhesive can be applied onto at least one of the interior threshold subunit and the exterior sill subunit. The adhesive can be applied as a bead or otherwise. In some embodiments, the adhesive can be applied onto a surface of the interior threshold subunit.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A multi-part sill assembly for a fenestration unit comprising:

an exterior sill subunit, wherein the exterior sill subunit is formed of a metal; and an interior threshold subunit;

wherein the interior threshold subunit is formed of a composite material;

wherein the interior threshold subunit is joined to the exterior sill subunit by at least three different points of contact;

the three different points of contact comprising a pivoting joint;

a locking joint; and an adhesive joint.

2. The multi-part sill assembly of claim 1, the exterior sill subunit comprising an adhesive distribution shelf, wherein the adhesive joint is formed with the adhesive disposed between the adhesive distribution shelf and a surface of the interior threshold subunit.

3. The multi-part sill assembly of claim 2, wherein the adhesive distribution shelf is curved.

4. The multi-part sill assembly of claim 2, wherein the adhesive distribution shelf is curved downward and towards an interior side of the multi-part sill assembly.

5. The multi-part sill assembly of claim 2, wherein the adhesive is a high modulus adhesive.

6. The multi-part sill assembly of claim 2, the exterior sill subunit further comprising an adhesive retention channel, wherein the adhesive retention channel is adjacent the adhesive distribution shelf.

7. The multi-part sill assembly of claim 1, wherein the adhesive joint forms a water-tight seal.

8. The multi-part sill assembly of claim 1, the locking joint comprising a snap-fit mechanism.

9. The multi-part sill assembly of claim 8, wherein the snap-fit mechanism includes complementary portions disposed on the interior threshold subunit and the exterior sill subunit.

10. The multi-part sill assembly of claim 1, the pivoting joint comprising:

a receiver; and a projection.

11. The multi-part sill assembly of claim 10, wherein at least one of the projection and the receiver are disposed on the interior threshold subunit and the other is disposed on the exterior sill subunit.

12. The multi-part sill assembly of claim 1, wherein the pivoting joint is disposed below the adhesive joint.

13. The multi-part sill assembly of claim 1, wherein the pivoting joint is disposed at an exterior position relative to the adhesive joint.

14. The multi-part sill assembly of claim 1, wherein the pivoting joint is adjacent a top of the multi-part sill assembly.

15. The multi-part sill assembly of claim 1, wherein the locking joint is disposed at an exterior position relative to the adhesive joint.

16. The multi-part sill assembly of claim 1, wherein the locking joint is adjacent a top of the multi-part sill assembly.

17. The multi-part sill assembly of claim 1, the composite material comprising:

a polymer resin; and wood particles.

18. A multi-part sill assembly for a fenestration unit comprising:

an exterior sill subunit, wherein the exterior sill subunit is formed of a metal, the exterior sill subunit comprising a bottom projection;

a first locking arm; and an adhesive distribution shelf;

an interior threshold subunit, the interior threshold subunit comprising a bottom receiving pocket, wherein the bottom receiving pocket is configured to receive the bottom projection;

a second locking arm, wherein the second locking arm is configured to interlock with the first locking arm; and an inner wall surface;

wherein the interior threshold subunit is formed of a composite material; and a structural adhesive, wherein the structural adhesive is disposed between the adhesive distribution shelf and the inner wall surface.

19. A multi-part sill assembly for a fenestration unit comprising:

an exterior sill subunit, wherein the exterior sill subunit is formed of a metal, the exterior sill subunit comprising a top receiving pocket;

a first locking arm; and an adhesive distribution shelf, an interior threshold subunit, the interior threshold subunit comprising a top projection, wherein the top projection is configured to fit into the top receiving pocket;

a second locking arm, wherein the second locking arm is configured to interlock with the first locking arm; and an inner wall surface;

wherein the interior threshold subunit is formed of a composite material; and a structural adhesive, wherein the structural adhesive is disposed between the adhesive distribution shelf and the inner wall surface.

20. The multi-part sill assembly of claim 1, wherein the exterior sill subunit is brought into engagement with the interior threshold subunit by:

bringing the interior threshold subunit into contact with the exterior sill subunit to form the pivoting joint; and pivoting the interior threshold subunit about the pivoting joint until portions of the interior threshold subunit and the exterior sill subunit interlock forming the locking joint and a structural adhesive is distributed about the adhesive joint.

* * * * *